United States Patent [19]

Brunelle

[11] 4,323,668

[45] Apr. 6, 1982

[54] (ORTHO-ALKOXYCARBONYARYL)-CARBONATE TRANSESTERIFICATION

[75] Inventor: Daniel J. Brunelle, Scotia, N.Y.

[73] Assignee: General Electric Company, Schenectady, N.Y.

[21] Appl. No.: 212,386

[22] Filed: Dec. 3, 1980

[51] Int. Cl.³ .............................................. C08G 63/62
[52] U.S. Cl. .................................... 528/173; 528/196; 528/200; 528/202
[58] Field of Search ................. 528/173, 196, 200, 202

[56] References Cited

U.S. PATENT DOCUMENTS 4,130,548 12/1978 Kochanowski ..................... 528/202

Primary Examiner—Maurice J. Welsh
Attorney, Agent, or Firm—Joseph T. Cohen; James C. Davis

[57] ABSTRACT

A polycarbonate transesterification process comprising reacting (ortho-alkoxycarbonylaryl)carbonates and dihydric phenol under transesterification reaction conditions.

9 Claims, No Drawings

(ORTHO-ALKOXYCARBONYARYL)-CARBONATE TRANSESTERIFICATION

CROSS REFERENCE TO RELATED APPLICATIONS

This invention is related to U.S. patent applications Ser. Nos. 106,855 and 106,856 filed 12-26-79; 134,349 filed 3-20-80; and 134,705 filed 3-21-80; 143,804 and 143,805 both filed 3-21-80 all of Daniel Joseph Brunelle, and U.S. Pat. No. 4,217,438 filed 12-15-78 of Daniel Joseph Brunelle and William Edward Smith. The above applications are assigned to the assignee of this invention and all of their disclosures are incorporated herein in their entirety by reference.

BACKGROUND OF THE INVENTION

1. Field of the Invention

This invention relates to a polycarbonate transesterification process comprising reacting a (ortho-alkoxycarbonylaryl)carbonates and dihydric phenols under transesterification reaction conditions.

2. Description of the Prior Art

In general, polycarbonate transesterification prior art including The Encyclopedia of Polymer Science, Vol. 10 (1969), Chemistry and Physics of Polycarbonates, Polymer Reviews, H. Schnell, Vol. 9, John Wiley and Sons, Inc. (1964); "Polycarbonates", Christopher and Fox, Reinhold Corporation of New York (1962); among other publications, including numerous U.S. and foreign patents including Great Britain Pat. No. 1,079,822 issued to Bayer (1966), authored by Curtius, Ludwig, Bottenbruch and Schnell, report that generally effective transesterification reactions involving aromatic dihydroxy compounds with carbonic acid aromatic diesters can be carried out in the presence of basic catalysts in the formation of high molecular weight impact-resistant thermoplastic polycarbonates.

DESCRIPTION OF THE INVENTION

This invention embodies a polycarbonate transesterification process comprising reacting a (ortho-alkoxycarbonylaryl)carbonates and dihydric phenols under transesterification reaction conditions.

The "(ortho-alkoxycarbonylaryl)carbonates" also referred to herein as a carbonic acid aromatic diesters containing an alkyl salicylate group is defined herein by the general formula:

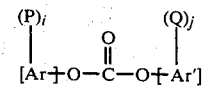

where at least a P or Q substituent is an ortho-positioned alkoxycarbonaryl group, i.e., a —COOR group, R being a $C_{1-4}$ alkyl (an alkyl group containing from 1 to 4 carbon atoms) directly bonded to a ring carbon atom located adjacent to an oxo group of the carbonate, i and j represent whole numbers of at least 1 up to a maximum equivalent to the number of replaceable hydrogen or $C_{1-4}$ alkyl groups substituted for on the aromatic rings comprising Ar and Ar'.

Sterically hindered (ortho-alkoxycarbonylaryl)carbonates having P and Q substituents positioned on all available ortho positions of the same aromatic ring are excluded as reactants in this patent.

Presently preferred (ortho-alkoxycarbonylarly)carbonates are of the formula:

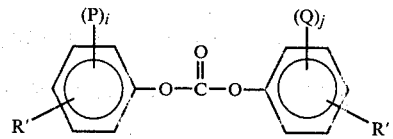

where independently at least a P or Q is an ortho-positioned alkoxycarbonylaryl group, i and j are as defined above, and R' is a $C_{1-4}$ alkyl group. Specific examples follow:

bis(o-methoxycarbonylphenyl)carbonate
bis(o-ethoxycarbonylphenyl)carbonate
bis(o-propoxycarbonylphenyl)carbonate
bis(o-butoxycarbonylphenyl)carbonate
bis(isobutoxycarbonylphenyl)carbonate
o-methoxycarbonylphenyl-o-ethoxycarbonylphenylcarbonate,
bis[o-(tert-butoxycarbonylphenyl)]carbonate,
o-ethylphenyl-o-methoxycarbonylphenyl carbonate, and
p-(tertbutylphenyl)-o-(tert-butoxycarbonylphenyl)carbonate, etc. including mixtures thereof.

Any of the dihydric phenols, bases, as well as reaction parameters relative to amounts of reactants, etc., as well as reaction time, temperature and pressure described in U.S. Pat. No. 4,217,438 of D. J. Brunelle and W. E. Smith can be employed in the process of this invention. Accordingly, for brevity their descriptions are incorporated herein in their entirety by reference.

Illustratively, "dihydric phenols" include dihydric or dihyroxy aromatic compounds—also incorporated herein by reference—defined by Fox's Formula II in U.S. Pat. No. 3,153,008, column 2, lines 23-72 and column 3, lines 1-42. Presently preferred dihydric phenols are of the formulas:

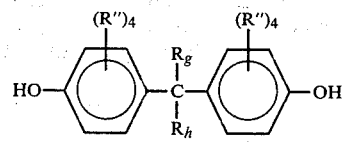

where independently each R" is hydrogen, $C_{1-4}$ alkyl, methoxy, bromine or chlorine, $R_g$ and $R_h$ are hydrogen or a $C_{1-30}$ monovalent hydrocarbon or hydrocarbonoxy group, and

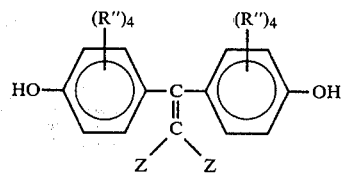

where independently each R" is as defined above and each Z is hydrogen, chlorine or bromine, subject to the proviso that at least one Z is chlorine or bromine.

Specific examples follow:
4,4'-dihydroxy-diphenyl-1,1-butane,
4,4'-dihydroxy-diphenyl-2-chlorophenyl methane,
4,4'-dihydroxy-diphenyl-2,2-propane also known as "BPA" or bis(4-hydroxyphenyl)propane-2,2
4,4'-dihydroxy-3-methoxy-diphenyl-2,2-propane, 4,4'-dihydroxy-3-isopropyl-diphenyl-2,2-propane,
4,4'dihydroxy-diphenyl-2,2-nonane,
4,4'-dihydroxy-2,2',3,3',5,5',6,6'-octamethyldiphenyl methane,
4,4'-dihydroxy-2,2'-dimethyl-5,5'-di-tert.-butyldiphenyl methane,
4,4'-dihydroxy-3,3',5,5'-tetrachloro-diphenyl-2,2-propane,
4,4'-dihydroxy-3,3',5,5'-tetrabromo-diphenyl-2,2-propane,
1,1-dichloro-2,2-bis(4-hydroxyphenyl)ethylene,
1,1-dibromo-2,2-bis(4-hydroxyphenyl)ethylene,
1,1-dibromo-2,2-bis(3,6-n-butyl-4-hydroxyphenyl)ethylene,
1,1-dichloro-2,2-bis(2-chloro-5-ethyl-4-hydroxyphenyl)ethylene,
1-bromo-2,2-bis(4-hydroxyphenyl)ethylene,
1,1-dichloro-2,2-bis(2-ethoxy-4-hydroxyphenyl)ethylene,
and
1-bromo-2,2-bis(3,5-diphenylether-4-hydroxyphenyl)ethylene, etc.

Illustrative specific examples of inorganic or organic bases that can be employed follow: sodium metal, lithium hydroxide, sodium carbonate, sodium acetate, sodium methylate, sodium tetrasulfide, sodium borohydride, isopropylamine, propanediamine, 1,2,2,6,6-pentamethylpiperidine, sodium benzoate, sodium phenoxide, sodium salts of bisphenol-A, etc.

Presently preferred bases are certain metal hydride catalysts—described in greater detail in U.S. Ser. No. 106,855 and 106,856 previously referred to—and include any compound which contains aluminumhydride or boronhydride ions, for example alkali metal, alkaline earth metal, quaternary ammonium, quaternary phosphonium, or tertiary sulfonium aluminumhydrides or boronhydrides.

An especially preferred metal hydride is the product obtained by forming a homogeneous solution or melt of a metal hydride containing aluminumhydride or boronhydride counterions with an (ortho-alkoxycarbonylaryl)carbonate or dihydric phenol, subsequently separating any solvent—if used, cooling, and recovering a homogenous solid pre-formed mixture of metal hydride and (ortho-alkoxycarbonylaryl)carbonate and/or a dihydric phenol, more preferably a bis(ortho-alkoxycarbonylaryl)carbonate.

Any amount of base can be employed. In general, effective mole ratios of base, e.g. LiOH, LiAlH$_4$, tetramethylammoniumborohydride (referred to herein as Me$_4$NBH$_4$), etc., to dihydric phenols are within the range of from about $10^{-8}$ or 1 or even lower to about 1 to 1, or even higher, preferably from $10^{-6}$ to 1 to about 0.02 to 1, and more preferably from $10^{-5}$ to 1 to $10^{-3}$ to 1. Generally, mole ratios of at least $10^{-5}$ to 1 enhances both the reaction rate and the yield of polycarbonate.

Any reaction pressure can be employed, e.g., atmosphere, subatmosphere or superatmospheric. Generally, however, the process is preferably carried out under a reaction pressure of approximately 1 atm. (760 mm. Hg.) during the initial phase of the reaction with a subsequent pressure reduction to values in the order of 0.1 to 1.0 Hg. (vacuum), or even lower.

Any reaction temperature can be employed. Optimum reaction temperatures are generally within the range of from 80° C. or even lower, to 300° C. or even higher, and more often to 120° C. to 260° C.

Any reaction time can be employed. Generally, optimum reaction time periods are from about 0.5 hours or even less to about 24 hours or even more.

EXAMPLE I COMPARATIVE TRANSESTERIFICATION DATA USING DIPHENYL CARBONATE AS A SUBSTRATE

A transesterification reaction was carried out using diphenyl carbonate as the carbonate substrate according to the following process parameters.

(A) FIRST STAGE TRANSESTERIFICATION:

230 g. of bis(4-hydroxyphenyl)propane-2,2 (1.0 mol.) and 235 g. of bis(diphenyl)carbonate (1.1 mol.) and 0.29 g. of lithium stearate (0.001 mol.) blanketed under a nitrogen (N$_2$) atmosphere was heated for 30 minutes to a temperature of about 180° C. After about one-half hour at 180° C., the pressure was varied accordingly: 100 mm Hg over the next 60 minutes, then 10 mm Hg for the next 60 minutes.

(B) SECOND STAGE TRANSESTERIFICATION:

The resulting first stage reaction BPA polycarbonate product was subsequently heated to a temperature of 285° C. over a 1 hour period.

A summary of the first and second stage process temperature sequence and MW$_w$ property of the resulting polycarbonate is set out in Table I.

TABLE I

| | | Summary of First and Second Stage Reaction Parameters | | | | |
|---|---|---|---|---|---|---|
| Example | Process Sequence | Cumulative Reaction Time/Hr. | Time Individual Interval/Hr. | Temp. °C. | Pressure Hg. | BPA PC MW$_w$[1] |
| I | First Stage | 0.5 | 0.5 | 25–180 | N$_2$ atm./760 mm | |
| | | 1.5 | 1.0 | 180–210 | N$_2$ atm./100 mm | |
| | | 2.5 | 1.0 | 210 | N$_2$ atm./10 mm | |
| | Summary | 2.5 | N.A. | 25–210 | N$_2$ atm./760–10 mm | |
| I | Second Stage | 1.0 | 1.0 | 25–285 | N$_2$ atm./760–0.3 mm | 45,000 |
| | Summary | 3.5 | N.A. | 25–285 | N$_2$ atm./0.3 mm | 45,000 |

Footnote:
[1] = GPC wt. ave. MW, relative to polystyrene.

EXAMPLE II COMPARATIVE TRANSESTERIFICATION DATA USING BIS(O-CHLOROPHENYL)CARBONATE AS A SUBSTRATE

A transesterification reaction was carried out using bis(o-chlorophenyl)carbonate as a substrate according to the following process parameters.

(A) FIRST STAGE TRANSESTERIFICATION:

230 g. of bis(4-hydroxyphenyl)propane-2,2 (1.0 mol.) and 286 g. of bis(o-chlorophenyl)carbonate (1.0 mol.) and 0.29 g. of lithium stearate (0.001 mol.) blanketed under a nitrogen ($N_2$) atmosphere was heated for 30 minutes to a temperature of about 180° C. Thereafter, the pressure was varied accordingly: 100 mm Hg over the next 45 minutes, then 10 mm Hg for the next 60 minutes.

(B) SECOND STAGE TRANSESTERIFICATION:

The resulting first stage reaction BPA polycarbonate product was subsequently heated to temperature of 260° C. over a 24 minute period.

A summary of the first and second stage process temperature sequence and $MW_w$ property of the resulting polycarbonate is set out in Table II.

TABLE II

| | | Summary of First and Second Stage Reaction Parameters | | | | |
|---|---|---|---|---|---|---|
| Example | Process Sequence | Cumulative Reaction Time/hr. | Time Individual Interval/ hr. | Temp. °C. | Pressure Hg. | BPA PC $MW_w$ |
| II | First Stage | 0.5 | 0.5 | 25–180 | $N_2$ atm./760 mm | |
| | | 1.25 | 0.75 | 210 | $N_2$ atm./100 mm | |
| | | 2.25 | 1.0 | 210 | $N_2$ atm./10 mm | |
| | Summary | 2.25 | N.A. | 25–210 | $N_2$ atm./760–10 mm | |
| II | Second Stage | 0.40 | 0.40 | 260 | $N_2$ atm./760–0.5 mm | 55,000 |
| | Summary | 2.65 | N.A. | 25–260 | $N_2$ atm./0.5 mm | 55,000 |

EXAMPLE III TRANSESTERIFICATION DATA USING BIS-(O-METHOXYCARBONYLPHENYL) CARBONATE AS A SUBSTRATE

A transesterification reaction was carried out using bis(o-methoxycarbonylphenyl)carbonate as a substrate according to the following process parameters.

(A) FIRST STAGE TRANSESTERIFICATION:

230 g. of bis(4-hydroxyphenyl)propane-2,2 (1.0 mol.) and 333 g. of bis(o-methoxycarbonylphenyl)carbonate (1.01 mol.) and 0.29 g. of lithium stearate (0.001 mol.) blanketed under a nitrogen ($N_2$) atmosphere was heated for 60 minutes to a temperature of about 150° C. Thereafter, the pressure was varied accordingly:

10 mm Hg over the next 10 minutes.

A summary of the first stage process temperature sequence and $MW_w$ property of the resulting polycarbonate is set out in Table III.

TABLE III

| | | Summary of First Stage Reaction Parameters | | | | |
|---|---|---|---|---|---|---|
| Example | Process Sequence | Cumulative Reaction Time/hr. | Time Individual Interval/ hr. | Temp. °C. | Pressure Hg. | PBA $MW_w$ |
| III | First Stage | 1.0 | 1.0 | 25–150 | $N_2$ atm./760 mm | |
| | | 1.16 | 0.16 | 150–260 | $N_2$ atm./10 mm | 49,000 |
| | Summary | 1.16 | N.A. | 25–260 | $N_2$ atm./760–10 mm | 49,000 |

In general, the use of (ortho-alkoxycarbonylaryl)carbonates in the polycarbonate transesterification process of this patent provides advantages not associated with other carbonate transesterification substrates, such as bis(ortho-haloaryl)carbonates or diphenylcarbonates. The use of (ortho-alkoxycarbonylaryl) carbonate substrates provides—when contrasted with bis(ortho-haloaryl)carbonates—the following advantages: (1) improved transesterification reaction rate, (2) less polycarbonate color formation during the transesterification reaction, (3) milder transesterification reaction conditions including lower temperatures, (4) reduced amounts of carbonate substrate since only stoichiometric amounts or amounts slightly in excess, e.g. 0.05 to 1%, are required for complete conversion of all dihydric phenol to polycarbonate, and (5) reduced or equivalent quantities of catalyst at improved reaction rate, temperature and pressure transesterification reaction conditions. Illustratively the transesterified polycarbonate end product derived from the process of this patent, preferably exhibit intrinsic viscosities of at least 0.3 and more preferably about 0.5 deciliters per gram (dl./g,) as measured in either methylene chloride or chloroform or similar solvent systems at 25° C. The upper intrinsic viscosity number is not critical, however, it will generally be about 1.5 dl./g. Especially useful polycarbonates generally have intrinsic viscosities within the range of from about 0.38 to about 0.7 dl./g. Preferably, the polycarbonates have a number average molecular weight of at least about 5000, and more preferably from about 10,000 to about 50,000, or higher. Polycarbonates of such molecular weight characteristics process easily in between about 450° C. F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

I claim:

1. A process for effecting a polycarbonate transesterification which comprises reacting a bis (ortho-alkoxycarbonylaryl) carbonate of the formula

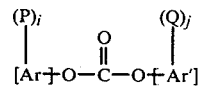

and a dihydric phenol under transesterification reaction conditions where at least a P or Q substituent is an ortho-positioned —COOR group, R being a $C_{1-4}$ alkyl directly bonded to a ring carbon atom located adjacent to an oxo group of the carbonate, i and j represent whole numbers of at least 1 up to a maximum equivalent to the number of replaceable hydrogen atoms or $C_{1-4}$ alkyl groups substituted for on the aromatic rings comprising Ar and Ar'.

2. The claim 1 process where the dihydric phenol is of the formula:

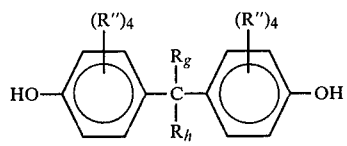

where independently each R" is hydrogen, $C_{1-4}$ alkyl, methoxy, bromine or chlorine, $R_g$ and $R_h$ are hydrogen or a $C_{1-30}$ monovalent hydrocarbon or hydrocarbonoxy group, or of the formula:

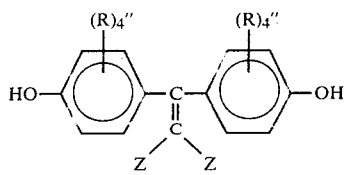

where independently each R" is as defined previously and each Z is hydrogen, chlorine or bromine, subject to the proviso that at least one Z is chlorine or bromine.

3. The claim 1 process where the transesterification reaction conditions employ a metal hydride catalyst selected from aluminumhydride and boronhydride.

4. The claim 3 process where the metal hydride is a pre-formed mixture of a metal hydride and a bis(ortho-alkoxycarbonylaryl)carbonate or a dihydric phenol.

5. The claim 1 process where the transesterification reaction conditions are at temperatures less than about 300° C.

6. The claim 5 process where the transesterification reaction conditions include an inert atmosphere.

7. The claim 1 process where the carbonate is bis(ortho-methoxycarbonylphenyl)carbonate.

8. The claim 2 process where the dihydric phenol is bis(4-hydroxyphenyl)propane-2,2.

9. A polycarbonate transesterification process comprising reacting bis(ortho-methoxycarbonylphenyl)carbonate and bis(4-hydroxyphenyl)propane-2,2 under transesterification conditions including the use of a metal hydride catalyst.

* * * * *